Oct. 8, 1946.  W. O. WEBBER  2,409,005
TREATING EMULSIONS
Filed May 27, 1944
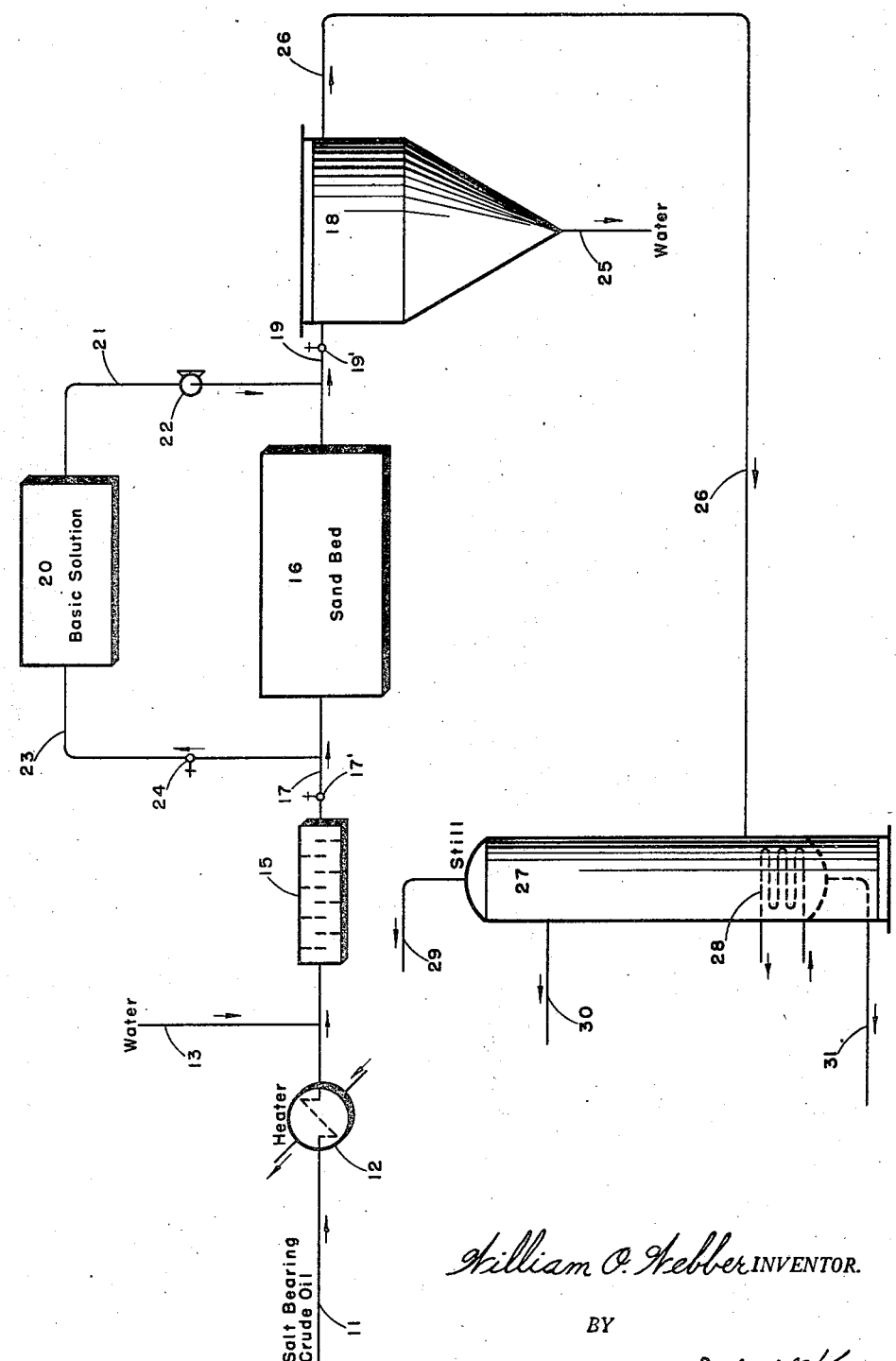
William O. Webber INVENTOR.
BY
J. D. McKean
ATTORNEY.

Patented Oct. 8, 1946

2,409,005

UNITED STATES PATENT OFFICE 2,409,005

TREATING EMULSIONS

William O. Webber, Baytown, Tex., assignor to Standard Oil Development Company, a corporation of Delaware Application May 27, 1944, Serial No. 537,651

5 Claims. (Cl. 252—322)

The present invention is directed to a method for treating emulsions of oil and water to coagulate the water component.

More particularly, the present invention is directed to the treatment of a mixture of petroleum and salt water to separate it into an oil fraction and a water fraction and involving the passage of the mixture through a coagulating bed to aid in the segregation of the water component. The present invention is particularly adaptable to the breaking of emulsions formed in the desalting of crude petroleum and which conventionally involves the admixing of water with the salt-bearing crude petroleum in order to dissolve the salt from the petroleum, and produces an emulsion which must be separated into an oil component and a water component.

When a crude petroleum containing appreciable amounts of salt is received at a refinery, it is desirable to remove the salt from the petroleum before it is subjected to distillation processes in order to eliminate the deposition of the salts in the distilling equipment. A known method for removing salt from crude oil includes the steps of heating the crude oil, admixing the crude oil with water with sufficient agitation to obtain intimate contact between the water and the oil to dissolve the salt from the oil, subsequently coagulating the water by passing the emulsion through a bed consisting of finely divided solids, such as sand, then settling to obtain an oil layer and a water layer, discarding the water and conducting the salt-free oil to a still for preliminary fractionation.

The filter bed of finely divided solid is usually kept in operation over a considerable period of time, such as several weeks, before the pressure drop through the bed becomes so great that it is necessary to take it out of service and clean it. Before putting the filter bed in operation it has heretofore been the practice to wash it with water in order to insure that it is preferentially wet by water before bringing it into contact with the emulsion to be broken.

I have now discovered that the coagulator effect of the filter bed may be substantially improved by giving it a pretreatment to insure the thorough water-wetting of the filter bed before it is brought into contact with the water and oil mixture. The pretreatment of the filter bed may briefly be described as involving the contacting of the filter bed with a basic solution. Examples of suitable basic solutions which have been found suitable for pretreating the filter bed are sodium carbonate, sodium hydroxide, ammonium hydroxide and potassium hydroxide. After the filter bed has been pretreated with the basic solution it may immediately be put into operation and the basic solution displaced by the admixture of water and oil, or optionally the filter bed may be washed with water and the wash water followed with the mixture of oil and water to be coagulated into its separate components.

The invention will be described in greater detail by reference to the accompanying drawing, in which the single figure is in the form of a diagrammatic flow sheet.

In the drawing a salt water crude oil mixture from which the salt is to be removed enters the system through line 11 and passes through a suitable heating means 12. Into the oil leaving heater 12 is injected water by means of inlet 13, and the water and oil are intimately admixed by being passed through contactor 15. The intimate contact of the hot oil and water allows the water to dissolve the salt from the oil and accordingly an admixture of brine and oil results. In order to separate this admixture or emulsion of brine and oil, it is passed through a suitable coagulating bed and subsequently allowed to settle.

The coagulator means conventionally employed is a bed of sand through which the emulsion is caused to pass. It will be understood, however, that beds formed of other finely divided water-wettable material, such as gravel, Excelsior, glass wool, hay or cotton, may also be employed. The coagulating bed is indicated as unit 16 in the drawing and is connected with contactor 15 by means of line 17, controlled by valve 17', and with a settling vessel 18 by means of line 19, controlled by valve 19'. Before the coagulator bed 16 is put into service it is pretreated in order to insure that it is thoroughly water-wet. Valves 17' and 19' are closed and a basic solution is then withdrawn from vessel 20 through line 21 by means of pump 22 and forced through coagulator bed 16 as back-wash. The back-wash is returned to vessel 20 by means of line 23, containing valve 24, which is open while the coagulator bed is being pretreated.

After the pretreatment of the sand bed by the basic solution, pump 23 is stopped, valve 24 closed and valves 17' and 19' opened to allow the mixture of water and oil from contactor 15 to flow through bed 16. The mixture withdrawn from bed 16 passes through line 19 and valve 19' into settling vessel 18, where it is allowed to remain quiescent and settles into a lower water layer and an upper oil layer. The lower water layer is withdrawn from settler 18 through line 25 and is discarded to a suitable means, as, for example, a sewer line, not shown. The oil layer is withdrawn from an upper portion of settler vessel 18 by means of line 26 and may be sent to a treating step in the refinery. In the drawing the line 26 discharges into a crude still 27, conventionally used for separating a crude oil into fractions of differing boiling points and indicated as being provided with a heating means 28 and withdrawal lines 29, 30 and 31.

Concentration of the basic solution employed for pretreating the coagulator bed may be varied over a wide range and satisfactory results obtained. If sodium hydroxide is employed as the pretreating solution, the concentration may be varied from .5 to 10 pounds of sodium hydroxide per 1,000 gallons of water or 0.0125 to 0.25 mole per 1,000 gallons of water. If other equivalent materials, such as sodium carobnate, ammonium hydroxide or potassium hydroxide is employed, the concentrations used may be varied over the range indicated for sodium hydroxide.

As an example illustrating the practice of the present invention, a sand filter bed 150 square feet in area and 2 to 3 feet in thickness was pretreated by back-washing it with 1,000 gallons of water to which was added 2 gallons of 50° Bé. sodium hydroxide solution. After the caustic solution was used to back-wash the sand filter, a mixture of oil and water from an incorporator was passed through the filter and from the filter sent to a first settling zone. The addition of the step of washing the filter with caustic solution resulted in removing 60% of the water from the mixture in the first coagulator settler stage. In contrast to the results obtained when pretreating the coagulator filter bed with caustic, the previous practice, in which the bed was washed simply with water before put on stream, caused the separation of only 10% of the water from the emulsion in the first coagulator settler stage.

Having fully described the present invention, what I desire to claim is:

1. A method for treating salt-bearing crude oil comprising the steps of heating the oil, adding water to the heated oil and agitating in order to form an intimate admixture of the oil and water and to dissolve the salt from the oil into the water, contacting a bed comprising water-wettable, finely divided solids with a basic solution having a concentration within the range of .0125 to .25 per pound mole per 1,000 gallons of water in order to insure the thorough water-wetting of the bed, passing the mixture of oil and water through said treated bed and subsequently settling the mixture into a water component and into an oil component suitable for feeding to a distillation unit.

2. In the treatment of a mineral oil containing salt to remove the salt therefrom and including the steps of admixing the salt-containing mineral oil with water, agitating to form an intimate mixture, passing the mixture through a sand bed and into a settling device for separating the mixture under the influence of gravity into a water component and an oil component, the step of pretreating the filter bed before the mixture of oil and water is brought into contact therewith by saturating the bed with a basic solution having a concentration within the range of .0125 to .25 pound moles per thousand gallons of water.

3. A method in accordance with claim 2 in which the basic solution is sodium hydroxide.

4. A method in accordance with claim 2 in which the basic solution is a solution of sodium carbonate.

5. A method in accordance with claim 2 in which the basic solution is an aqueous solution of ammonium hydroxide.

WILLIAM O. WEBBER.